US011972383B2

(12) United States Patent
Chen et al.

(10) Patent No.: US 11,972,383 B2
(45) Date of Patent: *Apr. 30, 2024

(54) SYSTEMS AND METHODS FOR TRACKING AND SCORING CLEANING

(71) Applicant: Intelligent Cleaning Equipment Holdings Co. Ltd., Tortola (VG)

(72) Inventors: Simon Nai Pong Chen, Dongguan (CN); York Jiam Pang, Dongguan (CN); Pui Keung Lam, Dongguan (CN); Bryan Michael Showers, Zeeland, MI (US)

(73) Assignee: Intelligent Cleaning Equipment Holdings Co. Ltd., Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,060

(22) Filed: Feb. 13, 2023

(65) Prior Publication Data

US 2023/0401516 A1 Dec. 14, 2023

Related U.S. Application Data

(63) Continuation of application No. 17/837,949, filed on Jun. 10, 2022, now Pat. No. 11,615,365, which is a
(Continued)

(51) Int. Cl.
*G06Q 10/06* (2023.01)
*G05D 1/00* (2024.01)
(Continued)

(52) U.S. Cl.
CPC ..... *G06Q 10/06393* (2013.01); *G05D 1/0287* (2013.01)

(58) Field of Classification Search
CPC .. G06Q 10/06393; G05D 1/0212; G05D 1/02; G05D 1/0246; G05D 1/0274;
(Continued)

(56) References Cited

U.S. PATENT DOCUMENTS 5,825,981 A 10/1998 Matsuda
11,615,365 B1 * 3/2023 Chen .................... B25J 11/0085
705/7.39
(Continued)

FOREIGN PATENT DOCUMENTS

CA 2886106 A1 * 7/2014 .......... A47L 11/4011
CA 2886451 A1 * 7/2014 .......... A47L 11/4011
(Continued)

OTHER PUBLICATIONS

EP22178472.1 European Search Report and Opinion dated Nov. 24, 2022.
(Continued)

*Primary Examiner* — Yuri Kan
(74) *Attorney, Agent, or Firm* — Wilson Sonsini Goodrich & Rosati

(57) ABSTRACT

The present disclosure provides systems and methods for tracking and scoring robot or machine performance. The robot or machine performance may comprise a metric that can be computed based on operational data for the robot or machine.

20 Claims, 10 Drawing Sheets

Related U.S. Application Data continuation of application No. PCT/CN2022/080437, filed on Mar. 11, 2022.

(51) Int. Cl.
 *G05D 1/02* (2020.01)
 *G06Q 10/0639* (2023.01)

(58) Field of Classification Search
 CPC ..... G05B 19/19; B25J 9/1694; B25J 11/0085; H04L 67/12; A47L 9/00; A47L 11/4011; G06V 20/10
 See application file for complete search history.

(56) References Cited

U.S. PATENT DOCUMENTS

| | | | |
|---|---|---|---|
| 2018/0211339 A1* | 7/2018 | Mowatt | H04L 67/12 |
| 2019/0239709 A1* | 8/2019 | Thomas | B25J 9/1694 |
| 2020/0100639 A1* | 4/2020 | Ullmann | G05B 19/19 |
| 2020/0122202 A1 | 4/2020 | Kraus et al. | |
| 2021/0177226 A1 | 6/2021 | Burns et al. | |
| 2021/0373558 A1* | 12/2021 | Schneider | G05D 1/0212 |

FOREIGN PATENT DOCUMENTS

| | | | | |
|---|---|---|---|---|
| CN | 104470685 A | | 3/2015 | |
| CN | 106200633 A | | 12/2016 | |
| CN | 106343925 A | | 1/2017 | |
| CN | 106343926 A | | 1/2017 | |
| CN | 107368079 A | | 11/2017 | |
| CN | 107807649 A | * | 3/2018 | ........... G05D 1/0246 |
| CN | 107960953 A | | 4/2018 | |
| CN | 109008800 A | * | 12/2018 | ............. A47L 11/24 |
| CN | 109152508 A | | 1/2019 | |
| CN | 109998429 A | | 7/2019 | |
| CN | 111526973 A | | 8/2020 | |
| CN | 112183403 A | * | 1/2021 | ............. G06V 20/10 |
| DE | 102018121335 A1 | | 2/2019 | |
| EP | 3002656 A1 | * | 4/2016 | ............... A47L 9/00 |
| EP | 3616853 A1 | | 3/2020 | |
| JP | 2013230294 A | | 11/2013 | |
| JP | 2020124508 A | | 8/2020 | |
| KR | 101551576 B1 | | 9/2015 | |
| WO | WO-2016063553 A1 | * | 4/2016 | ............... G05D 1/02 |
| WO | WO-2023168707 A1 | | 9/2023 | |

OTHER PUBLICATIONS

Notice of Allowance dated Nov. 17, 2022 for U.S. Appl. No. 17/837,949.
Office action dated Aug. 19, 2022 for U.S. Appl. No. 17/837,949.
PCT/CN2022/080437 Search Report and Written Opinion dated Nov. 25, 2022.

\* cited by examiner

FIG. 4B

SYSTEMS AND METHODS FOR TRACKING AND SCORING CLEANING

CROSS-REFERENCE

This application is a Continuation Application of U.S. application Ser. No. 17/837,949 filed on Jun. 10, 2022, now U.S. Pat. No. 11,615,365, issued Mar. 28, 2023, which is a Continuation Application of International Application No. PCT/CN2022/080437 filed on Mar. 11, 2022, each of which is incorporated herein by reference in its entirety for all purposes.

BACKGROUND

Robots and/or machines may be used to perform tasks, provide services, and navigate environments autonomously or semi-autonomously. Some robots or machines may be used to execute cleaning tasks in an environment in which the robot or machine is positioned or capable of navigating to or through with or without input or command by a human operator.

SUMMARY

It can be confusing to most people when reading and trying to interpret the data points and sensor readings of a cleaning machine and to determine how they relate to the cleanliness of an area that is being cleaned or that has been cleaned. Further, even with an understanding of the significance of individual data points, it may still be difficult to ascertain if an area has been successfully cleaned from the data alone. Answering the question of whether a physical space was successfully or properly cleaned takes time, physical effort, and unnecessary resources or additional human labor to either visually inspect the space or to perform data calculations.

The present disclosure relates generally to tracking and scoring the cleaning performance of one or more robots or machines. The present disclosure provides, in multiple aspects and embodiments, a network for monitoring and quantifying the cleaning performance of various robots or machines that are accessible or controllable via a network. In some cases, the network may comprise an interconnected network for connecting various servers, computing devices, robots, and/or machines to collectively enable fleet management capabilities and functionalities.

The present disclosure addresses various limitations and shortcomings of conventional robots and machines in the cleaning space. Commercially available robots and machines are unable to quantify a clean score for a robot, a machine, or an area that can be easily understood and interpreted by a user or an end consumer. Unlike other commercially available systems, the presently disclosed systems and methods may enable tracking and scoring of machine or robot cleaning performance based on various factors including, for example, machine or component operational data.

The systems and methods of the present disclosure may be implemented to enable real scoring and tracking of (i) the cleaning performance for a plurality of robots or machines and/or (ii) the cleanliness of an area cleaned using one or more robots or machines. In one aspect, the present disclosure provides a method for tracking cleaning. The method may comprise (a) obtaining operational data for one or more robots or machines and/or one or more components of the one or more robots or machines; and (b) computing a metric for one or more operations or procedures performed by the one or more robots or machines, based at least in part on the operational data for the one or more robots or machines and/or the one or more components of the one or more robots or machines.

In some embodiments, the one or more operations or procedures are performed autonomously, semi-autonomously, or non-autonomously by the one or robots or machines and/or an operator or administrator of the one or more robots or machines. In some embodiments, the one or more operations or procedures are performed with aid of one or more inputs from an operator or an administrator of the one or more robots or machines. In some embodiments, the one or more operations or procedures comprise a cleaning operation.

In some embodiments, the metric comprises a clean score. In some embodiments, the clean score is computed based on an area cleaned by the one or more robots or machines. In some embodiments, the clean score is computed based on a time spent to clean the area. In some embodiments, the clean score is computed based on a cleaning area goal set by an operator or an administrator of the one or more robots or machines. In some embodiments, the clean score is computed based on a time goal set by a user or an administrator of the one or more robots or machines. In some embodiments, the clean score is computed based on a ratio of the area cleaned and the cleaning area goal. In some embodiments, the clean score is computed based on a ratio of the time spent and the time goal. In some embodiments, the clean score is computed based on one or more weighted factors corresponding to a cleaning area or a cleaning time.

In some embodiments, the method may further comprise generating a report based at least in part on the operational data or the metric computed using said operational data. In some embodiments, the report tracks changes in the metric over time. In some embodiments, the method may further comprise providing the report to an operator or an administrator of the one or more robots or machines via a mobile application or a web application. In some embodiments, the method may further comprise providing the metric to an operator or an administrator of the one or more robots or machines via a graphical user interface (GUI). In some embodiments, the GUI is configured to provide a plurality of metrics for a plurality of locations in which the one or more operations or procedures are performed by the one or more robots or machines. In some embodiments, the GUI is configured to provide information on an area cleaned or a time spent cleaning each of the plurality of locations.

In some embodiments, the method may further comprise identifying one or more locations that require additional cleaning or a different cleaning routine, based at least in part on the metric. In some embodiments, the method may further comprise identifying a robot or a machine that requires maintenance, servicing, repair, or replacement, based at least in part on the metric. In some embodiments, the method may further comprise controlling an operation or a movement of the one or more robots or machines based at least in part on the computed metric.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIGS. 4A and 4B schematically illustrate a web interface for presenting clean score information, in accordance with some embodiments.

DETAILED DESCRIPTION

Figure 1:
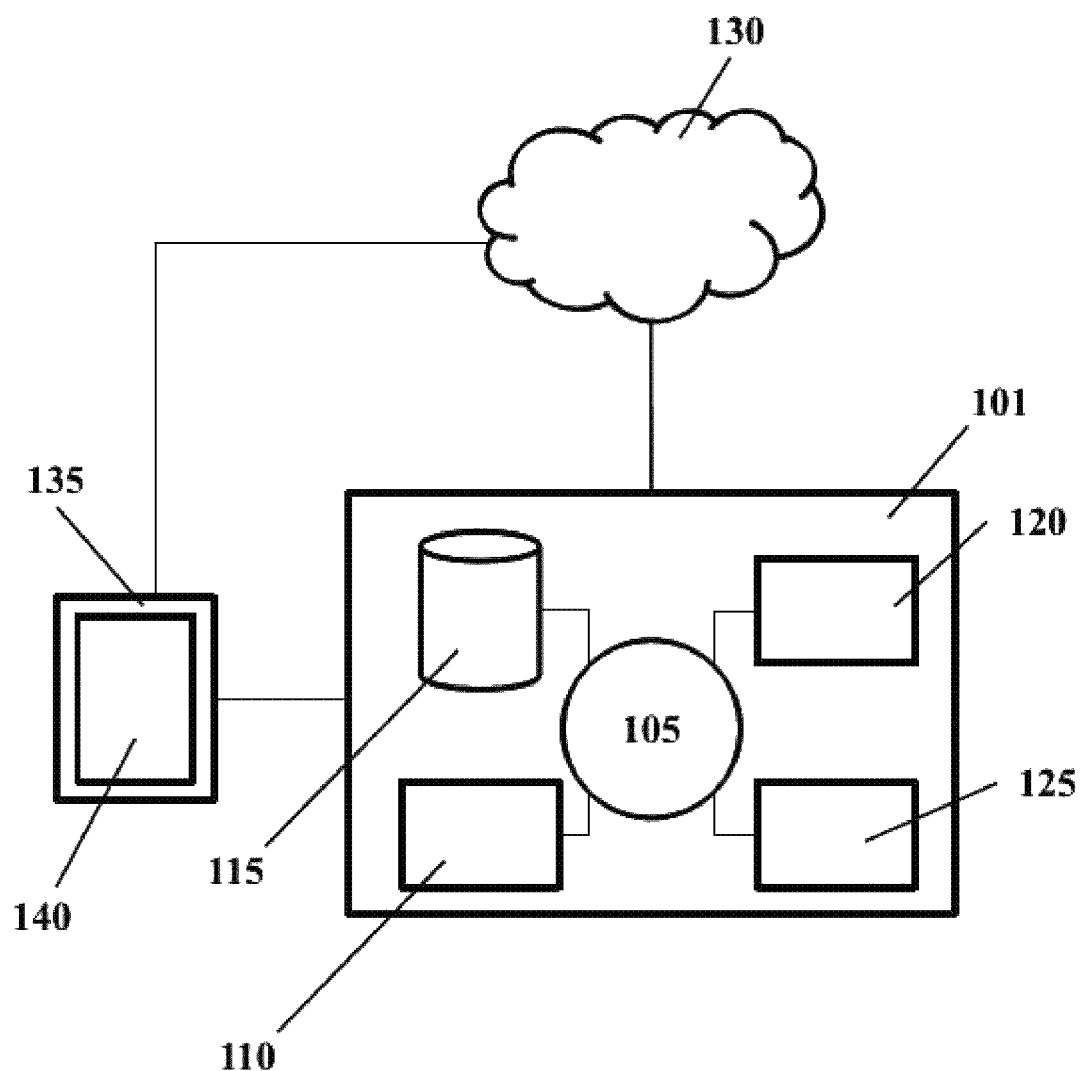
FIG. 1 schematically illustrates a computer system that is programmed or otherwise configured to implement any of the methods provided herein.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "real time" or "real-time," as used interchangeably herein, generally refers to an event (e.g., an operation, a process, a method, a technique, a computation, a calculation, an analysis, a visualization, an optimization, etc.) that is performed using recently obtained (e.g., collected or received) data. In some cases, a real time event may be performed almost immediately or within a short enough time span, such as within at least 0.0001 millisecond (ms), 0.0005 ms, 0.001 ms, 0.005 ms, 0.01 ms, 0.05 ms, 0.1 ms, 0.5 ms, 1 ms, 5 ms, 0.01 seconds, 0.05 seconds, 0.1 seconds, 0.5 seconds, 1 second, or more. In some cases, a real time event may be performed almost immediately or within a short enough time span, such as within at most 1 second, 0.5 seconds, 0.1 seconds, 0.05 seconds, 0.01 seconds, 5 ms, 1 ms, 0.5 ms, 0.1 ms, 0.05 ms, 0.01 ms, 0.005 ms, 0.001 ms, 0.0005 ms, 0.0001 ms, or less.

Overview

In an aspect, the present disclosure provides a method for monitoring one or more metrics associated with or relating to an operation of a robot or a machine. In some embodiments, the method may comprise a) obtaining operational data for one or more robots or machines and/or one or more components of the one or more robots or machines; and (b) computing a metric for one or more operations or procedures performed by the one or more robots or machines, based at least in part on the operational data for the one or more robots or machines and/or the one or more components of the one or more robots or machines.

In one non-limiting aspect, the present disclosure provides systems and methods for tracking and scoring cleaning. The presently disclosed systems and methods may be used to monitor, track, and score the cleaning performance of one or more robots or machines. The presently disclosed systems and methods may also be used to monitor, track, and score the cleanliness of an area that has been cleaned by one or more robots or machines. In some cases, the systems and methods of the present disclosure may be used to track one or more cleaning parameters associated with (i) an area that has been cleaned or has not been cleaned, is being cleaned, or will be cleaned, and/or (ii) one or more robots or machines used to clean said area. The one or more cleaning parameters may comprise, for example, the cleanliness of an area or the cleaning performance (e.g., the cleaning efficiency) of the one or more robots used to clean the area.

Robots/Machines

The systems and methods disclosed herein may be used to manage one or more robots and/or machines. In some embodiments, a machine may comprise an autonomous, semi-autonomous, and/or non-autonomous robot or machine. In some embodiments, a robot may comprise an autonomous, semi-autonomous, and/or non-autonomous machine or robot. In some embodiments, a robot may be referred to interchangeably as a machine, and a machine may be referred to interchangeably as a robot. In some cases, a robot may be equivalent to a machine, and vice versa. Alternatively, a robot may comprise a system that is capable of operating autonomously or semi-autonomously, and a machine may comprise a non-autonomous system that is capable of being operated by a human or another machine or robot.

In some embodiments, the robots or machines may comprise, for example, a non-autonomous, semi-autonomous, or autonomous vehicle, a rover, a drone, or a shuttle for transporting humans or objects. In some cases, the robots or machines may comprise a humanoid robot or a non-humanoid robot. In some cases, the robots or machines may comprise a cleaning machine or robot (e.g., a floor scrubber or a vacuum).

In any of the embodiments described herein, the one or more robots or machines may be configured to operate individually or collectively as a fleet or a swarm of robots or machines. The term "fleet" as used herein may refer to any grouping or collection of a plurality of robots or other machines that are independently or jointly controllable by a human or a computer system. The fleet may comprise one or more robots and/or one or more machines. The one or more robots and/or the one or more machines may comprise a non-autonomous, semi-autonomous, or autonomous robot or machine that can be controlled either locally or remotely. The robots and/or machines in the fleet may be controlled by a human operator and/or a computer. In any of the embodiments described herein, the fleet may comprise a combination of robots and/or machines. In any of the embodiments described herein, the fleet may comprise a combination of autonomous, semi-autonomous, and/or non-autonomous robots and/or machines.

In some embodiments, the robots or machines may comprise a non-autonomous robot or machine. Such non-autonomous robot or machine may not or need not comprise or have autonomous navigation functions or capabilities. In some cases, such non-autonomous robot or machine may be configured to operate based on one or more inputs, commands, or instructions provided by a human operator. The one or more inputs, commands, or instructions may comprise a physical motion to move the robot or machine, an auditory communication, or a virtual input or selection of an action or movement to be performed by the robot or machine.

In some embodiments, the robots or machines may comprise a treatment or sanitization subsystem. The treatment or sanitization subsystem may be configured to perform a treatment operation (e.g., a sanitization operation or a disinfection operation) for one or more components or portions of the robot or machine. In some cases, the treatment or sanitization subsystem may be configured to treat or sanitize a hazardous or toxic material or any other material that can be harmful to human health.

In some cases, a gas or a fluid may pass through a portion of the robot or machine to perform a cleaning operation. The gas may comprise, for example, ambient air that can be sucked into the robot or machine from the environment surrounding the robot or machine (e.g., by way of a vacuum or a negative pressure source). The fluid may comprise, for example, water, cleaning fluid, or any mixture thereof. In some cases, the gas or fluid may be used to pick up or transport dirt, debris, or other unclean objects or substances from an environment or area to be cleaned. In some cases, the gas or fluid may be used to remove dirt, debris, or other unclean objects from an environment or area to be cleaned. The gas or fluid may pass through one or more components or subsystems of the robot or machine (e.g., a filter or a recovery tank), and the one or more components or subsystems may build up dirt, debris, or other unclean objects or substances over time (either naturally over the course of machine operation, or due to insufficient cleaning of the components or subsystems by an operator of the robot or machine). This can generate an odor, and in some cases, the dirt, debris, or other unclean objects or substances can be hazardous, toxic, or otherwise harmful to human health. In such a scenario, the treatment or sanitization subsystem described above can be used to perform a treatment procedure and/or to at least partially sanitize or disinfect the dirt, debris, or other unclean objects or substances collected during a cleaning operation in order to make the dirt, debris, or other unclean objects or substances less hazardous, toxic, or harmful. The treatment or sanitization process may optionally involve treatment of waste water to reduce biohazard exposure and to mitigate health risks to operators.

In some cases, the treatment or sanitization subsystem can be integrated with or embedded in a component or another subsystem of the robot or machine. The component or other subsystem of the robot or machine may comprise, for example, a recovery tank of the robot or machine. In some cases, the treatment or sanitization subsystem can be provided on or coupled to an external portion of the robot or machine for ease of access, servicing, or maintenance. In some cases, the treatment or sanitization subsystem may be activated when the recovery tank is closed.

In one non-limiting example, the treatment or sanitization subsystem can comprise a light source configured to irradiate a material with light in order to perform a disinfection or sanitization process. In some cases, the light source may be attached to or integrally formed on an inside portion of a recovery tank of a cleaning robot or a machine.

In some cases, the light source may comprise a UV light source. The UV light source may comprise one or more UV-LEDs. The UV light source may emit light having a wavelength corresponding to ultraviolet (UV) light. In some cases, the treatment or sanitization subsystem may comprise a UV light or a UV-C light having potent germicidal properties (e.g., the ability to inactivate viruses and bacteria). In some cases, the wavelength of light may range from about 100 nanometers (nm) to about 280 nm. Exposure to the light may result in sanitization or disinfection, or even sterilization depending on how much UV energy is emitted.

In some cases, the UV light source may be powered by a power supply located on the robot or machine. In some cases, the UV light source can be powered by a solar panel. The solar panel may comprise one or more solar energy cells. In some embodiments, a solar panel and/or a power source can be electrically coupled to the UV light source to provide power to the UV light source (e.g., at different times during the day).

As described above, the UV light source may comprise one or more UV-LEDs. In some cases, the one or more UV-LEDs may be provided in a grid pattern. Alternatively, the UV-LEDs may be provided in a radial pattern, or any regular or irregular pattern. In some cases, a plurality of UV-LEDs may be controlled, either individually or collectively, to illuminate a component or an internal area or volume of the robot or machine for cleaning, treatment, sanitization, and/or disinfection.

In some embodiments, the robots or machines described herein may be configured to monitor the cleanliness level of the waste water or recovery tank. In some cases, the robots or machines may be configured to activate a UV light periodically to help sanitize, disinfect, or de-odorize the tank after it has been emptied. In some cases, the robots or machines may monitor the cleanliness of the tank inside the robot or machine which is used to recover waste water, which can contain contaminants, dirt, used cleaning solution, and other harmful or undesirable materials or substances. In some embodiments, a tank disinfecting, sanitization, or de-odorizing cycle can be activated after the conclusion of every cleaning operation, as long as the tank has been emptied of waste water. In some embodiments, a tank disinfecting, sanitization, or de-odorizing cycle can be activated based on the floor area cleaned or the duration of cleaning. In some embodiments, a tank disinfecting, sanitization, or de-odorizing cycle can be activated based on a measurement of the dirtiness level of the water that is in the waste water tank, or the dirtiness level of the waste water tank once it has been emptied. In some instances, a UV light may be used for the tank disinfecting, sanitization, or de-odorizing cycle. If a UV light is used to disinfect or sanitize the interior of a waste water tank or a recovery tank, then the tank may be lined with a metallic material, since UV light can cause damage to plastic linings.

Environment

In some embodiments, the systems and methods of the present disclosure may be used to score the cleaning performance of one or more robots or machines operating in an environment. The environment may comprise an indoor environment or an outdoor environment. In some cases, the environment may comprise a combination of one or more indoor environments and one or more outdoor environments. The indoor environment may comprise, for example, a building, an office, a home, a store, or any other space or area that is at least partially enclosed by one or more walls, ceilings, panels, flooring, or other structural elements. The outdoor environment may comprise, for example, any space that is at least partially exposed to the natural elements, including, for example, public spaces, private spaces that are not enclosed by a structural element or component, roadways, terrestrial or aquatic ecosystems, and the like.

In some embodiments, the systems and methods of the present disclosure may be used to score the cleanliness of an environment. The environment may comprise any indoor and/or outdoor environment as described above. The cleanliness of the environment may be assessed after one or more robots or machines clean the environment.

Tracking/Monitoring

The presently disclosed systems and methods may be used to monitor and track the cleaning performance of one or more robots or machines. Tracking and monitoring the cleaning performance of the one or more robots or machines may involve determining or quantifying the cleaning performance of the one or more robots or machines over space and/or time. In one example, tracking and monitoring the cleaning performance of the one or more robots or machines may comprise determining or quantifying cleaning performance at different points in time. In another example, tracking and monitoring the cleaning performance of the one or more robots or machines may comprise determining or quantifying cleaning performance at different points or locations within or across a target area (e.g., as the robot or machine is travelling through the environment to be cleaned).

The robots and machines described herein may be associated with a particular cleaning site. In some cases, tracking the clean score for a particular site may involve tracking the cleaning performance of the robots or machines associated with the cleaning site. The clean score for a particular site may be used to indicate if a cleaning goal for the cleaning site was met and how well (e.g., how efficiently) the robot or the machine achieved the clean score.

Clean Score—Robot or Machine

The presently disclosed systems and methods may be used to score the cleaning performance of one or more robots or machines. Scoring the cleaning performance may comprise computing or assigning a value to the cleaning performance of the one or more robots or machines.

Clean Score—Environment

The presently disclosed systems and methods may be used to score the cleanliness of an area or environment before, during, and/or after one or more cleaning operations. The cleaning operations may be performed by any one or more robots or machines as described elsewhere herein. Scoring the cleanliness of the area or environment may comprise computing or assigning a value to the cleanliness of the area or environment.

Clean Score—Computation

In some embodiments, the clean score may be a composite index number that is computed using cleaning data with different weighted values assigned to the cleaning data. The clean score may provide an easily understandable metric (e.g., a single number) that indicates whether a space was satisfactorily cleaned, marginally cleaned, or unsatisfactorily cleaned. The cleaning data used to compute the clean score may be derived from one or more datapoints or sensor readings obtained using one or more sensors. The one or more sensors may be provided on or integrated with the one or more robots or machines used to clean an area.

In some cases, the clean score composite index may comprise various ranges that represent whether a space was satisfactorily cleaned, marginally cleaned, or unsatisfactorily cleaned. In one non-limiting example, a satisfactory clean score may comprise a score that is greater than or equal to 90. In another non-limiting example, a marginal clean score may comprise a score that is greater than or equal to 70 and less than or equal to 89. In a further non-limiting example, an unsatisfactory clean score may comprise a score that is less than 70. The ranges for each type of score (i.e., satisfactory, unsatisfactory, or marginal) may be adjusted based on user preference or the characteristics or properties of (i) the space cleaned or (ii) the robot or machine used to clean the space or (iii) time spent by the robot or machine to clean the space.

In one embodiment, the clean score may be computed based on the following formula:

$$\text{Clean Score} = 100 * (\text{Area Cleaned}/\text{Area Goal}) * 0.8 + ((\text{Area Cleaned}/\text{Area Goal})/(\text{Time Cleaned}/\text{Time Goal})) * 0.2$$

In some embodiments, the clean score may be computed based on a ratio of the area cleaned to an area goal. The area goal may be set by a user or an operator of the cleaning robot or machine. The area goal may be set by an entity supervising the user or the operator of the cleaning robot or machine. The formula above may be designed to prioritize the consideration of whether an end user's space or environment was completely cleaned. In some cases, a bonus value may be factored in to increase the clean score based on how efficiently the space or environment was cleaned.

The clean score may be computed based on a ratio of the time cleaned to a time goal. The time goal may be set by a user or an operator of the cleaning robot or machine. The time goal may be set by an entity supervising the user or the operator of the cleaning robot or machine.

In some embodiments, the clean score may correspond to one or more industry standards for assessing the cleanliness of an area. For example, the clean score may correspond to an International Sanitary Supply Association (ISSA) cleaning standard.

The clean scores described herein may be derived for each area or environment to be cleaned by a robot or a machine. In some cases, the clean scores may be derived based on the data respectively received for each individual machine in a fleet. The data from each robot or machine can be analyzed (e.g., by using a central server that is communication with each individual robot or machine in the fleet) to determine cleaning progress or cleaning performance at a select location (e.g., a location of interest).

In some cases, the square footage of area cleaned can be calculated using a wheel sensor (e.g., a wheel encoder) to measure the wheel revolutions. The number of revolutions can be multiplied by the circumference of the wheel of a robot or machine and the cleaning path width of the robot or machine to derive the square footage of the area cleaned. In some cases, the square footage of area cleaned can be calculated based on a known map of an area and the distance travelled by the robot or machine between various waypoints or known locations within the area. In some cases, the robot or machine may create reference maps of a cleaning area, and a potential cleanable area can be calculated by navigation software used to operate the robot or machine. In some cases, the robot or machine can also calculate the actual area cleaned by determining what portion of a route has been completed or what portion of the potential cleanable area has been traversed or cleaned, and/or by measuring the distance travelled between waypoints located in the potential cleanable area.

In some cases, the cleaning time may be determined or measured based on the time a machine or robot is being used. In some cases, the cleaning time may be determined or measured based on the time during which a component of the robot or machine is engaged. The component may comprise, for example, a motor, a brush, a squeegee, or any other component of the robot or machine that enables the robot or machine to perform a cleaning task or navigate a cleaning area (i.e., an area to be cleaned).

In some cases, the clean score can be computed based on the time spent to clean an area. The accuracy of the "time cleaned" metric can be optimized to account for robot or machine downtime, maintenance, repair, servicing, or other temporary pauses in machine operation during a cleaning operation. In some cases, the clean score may be further optimized to factor in changes in cleaning performance or cleaning efficiency when a manual cleaning mode is engaged for one or more autonomous cleaning robots or machines in a fleet.

Alternative Computations

In some cases, the clean score may be computed based on one or more sensor readings. The one or more sensor readings may indicate the cleanliness of waste water collected by the machine, or the quality of air of the environment. In some cases, the quality of the air may be determined based on a cleanliness of a filter used to capture and filter particles from the air of the environment in which a cleaning robot or machine is operated. In some non-limiting embodiments, the one or more sensor readings may be derived using a total dissolved solids (TDS) sensor.

In some embodiments, the clean score may be computed based on a measurement of light reflectivity of a surface. The measurements of light reflectivity may indicate the relative cleanliness of the surface. The measurements of light reflectivity may be taken before and after cleaning and compared to determine a change in a reflectivity of the surface due to a cleaning operation.

In some embodiments, the clean score may be computed based on operational data for a robot or machine. In some embodiments, the operational data may comprise information on a frequency at which one or more treatment or sanitization procedures occur or need to occur. In some cases, the operational data may comprise information on a duration for which treatment or sanitization procedures occur or need to occur. In some cases, the frequency information and/or the duration information may indicate how much or how often cleaning is performed over time, which can be correlated to a cleaning performance or a level of cleanliness for an area or an environment. In some cases, the frequency information and/or the duration information may factor into the computation of a clean score as described elsewhere herein.

ATP

In some cases, a metric may be computed based on an adenosine triphosphate (ATP) test. The ATP test can generate a number or metric that correlates to the amount of bacteria or pathogens present in an area or on a surface. If an ATP reading exceeds a threshold level, it can indicate that additional cleaning needs to be performed before microbe populations become harmful and/or pose a risk to human health. The ATP test can involve detecting the presence of ATP or adenosine triphosphate, a small molecule found in biological organisms, using any of the sensors described here. By testing for the presence of ATP on a surface or in a region to be cleaned, one can detect the presence or growth of microorganisms such as bacteria.

In some cases, an ATP test may be conducted (1) before a cleaning solution is applied to an area and then (2) after the area is cleaned. The test results before and after the cleaning can be compared, and such comparison can factor into the computation of a cleaning metric.

Gloss/Reflection

In some cases, a cleaning metric can be computed based on a gloss or a reflectivity of a surface. The gloss or reflectivity can be correlated to an amount of residue present (e.g., dirt or soap residue). A lower gloss or reflectivity can indicate that there is soap residue left on the floor, which can be a safety hazard if the floor becomes wet, and/or attract dirt which can require more frequent cleaning. Soap residue can also indicate that a robot, machine or an operator is using too much soap, wasting money, and negatively impacting the environment.

Alternative Cleaning Metrics

In some cases, a cleaning metric can be computed based on a first input associated with an ATP test conducted for a target area to be cleaned and a second input associated with a gloss or a reflectivity of the target area to be cleaned. ATP can indicate that grease and organic materials have been removed. The gloss or reflectivity can indicate whether soap residue has been removed. In some cases, a low ATP score and a high gloss or reflectivity may correspond to a positive cleaning metric indicating that a target area is clean and safe. In some cases, the cleaning metric may inform a user or an operator of a cleaning robot or machine of soap usage in order to help the operator, robot or machine reduce soap utilization and extend cleaning cycles.

In some alternative embodiments, the cleaning metric can be computed based on data obtained from one or more vision sensors. In some cases, the vision sensors may be configured to detect debris on a floor. The amount of detected debris or a relative change in the amount of debris over time (e.g., before and after a cleaning operation) may be used to compute the cleaning metric.

In some exemplary embodiments, the cleaning metric can be computed based on data obtained from an impact sensor or an accelerometer. The impact sensor or accelerometer can be used to determine cleaning efficiency, and whether the robot, machine or an operator of the robot or machine has followed an optimal path or cleaning routine (i.e., whether the actual path or cleaning routine used corresponds to a trained or reference path or cleaning routine).

In some embodiments, the cleaning metric can be computed based on air quality data. The air quality data can be derived from one or more sensors that can detect pollutants or particles in the air. In some cases, the one or more sensors can be configured to detect a concentration of the pollutants or particles relative to other particles present in the air.

In some embodiments, the cleaning metric can be computed based on an amount or level of water remaining on a surface after a cleaning operation. The amount or level of water remaining can be detected using computer visions sensors. The cleaning metric corresponding to the amount or level of water remaining on a surface after a cleaning operation can be used to adjust or reprioritize a robot's or a machine's route to pick up the water.

In some cases, a robot or machine can recognize and respond to a spill or a pool of water or moisture using AI vision sensors. In some cases, the robot or machine can be instructed to respond to water remnants in a particular location, or deployed in a specific location containing water remnants to be picked up.

In some embodiments, the cleaning metric can be determined based on a detection of robot or machine misuse or abuse. The misuse or abuse can be determined based on the floor surface type and trends in amp draw on a motor of the robot or machine. For example, if a user traverses a non-approved surface (e.g., a steel grate instead of a concrete floor), a processing unit can detect a "blip" or a change (e.g., increase or decrease) in amp draw, and alert the user that this is unsafe usage of the machine. If a user continues to operate the machine in an unsafe, inefficient, or sub-optimal way, the cleaning metric may decrease. Changes in the cleaning metric can be conveyed to a user, an operator, or an administrator of the robot or machine.

In some embodiments, the cleaning metric can be computed based on a dosage level used for chemicals or liquid cleaners. In some cases, the pH of a cleaning solution can be tested to detect whether chemical or liquid cleaners are being overused. The pH of the cleaning solution can be compared to a reference or target pH value, and such comparison can be used to determine the cleaning metric. In some cases, if the pH of the cleaning solution is outside of a target range, the cleaning metric can decrease. In such cases, the decrease can be attributed to the fact that overusing or underusing certain chemicals which make up the cleaning solution is not cost efficient and can leave more soap residue behind (which means a less thorough cleaning that also results in higher usage of chemicals than actually needed).

In some embodiments, the cleaning metric can be computed based on an amount of exhaust pollutants detected from a robot or a machine. In some cases, a sensor may be placed at or near an exhaust of a motor of a cleaning robot or machine to detect an amount of pollutants in the exhaust. The amount of pollutants can indicate an amount of dirt or debris captured by the robot or machine during a cleaning operation. In some cases, the exhaust of a robot or machine can pollute the air with organic material within the exhaust, which can comprise air being pulled through a wastewater tank of the robot or machine. In some cases, the amount of pollutants in the exhaust can impact the cleaning metric. In some cases, different types or compositions of cleaning liquids can be used to keep the wastewater tank clean and reduce the number of pollutants in the exhaust. In some cases, the sensor can detect a reduction in pollutants in the exhaust, and the cleaning metric can be updated or adjusted accordingly.

Hierarchy

In any of the embodiments described herein, the cleaning metric can be computed based on a number of factors. The factors can include, for example, fulfillment. Fulfillment can indicate whether a robot or machine actually performed a cleaning operation (regardless of the quality of the cleaning) or whether the robot or machine was actually operated to clean a space. The factors can also include, for example, cleaning quality. Cleaning quality can correspond to whether the surfaces or an environment are, in fact, clean. Such cleaning quality can be computed quantitatively using any of the methods or methodologies described herein. In some cases, the cleaning quality may be determined based on any of the cleaning metrics described herein. In some cases, the factors can include application quality (i.e., are the cleaning practices or routines used the most efficient and effective over time). The application quality can be used to educate a user or an operator as to whether a cleaning practice, logic, or routine can be further optimized.

Sensors

The systems and methods disclosed herein may be implemented using one or more sensors. The one or more sensors may be configured to obtain operational data for a robot or a machine. The one or more sensors may comprise, for example, a wheel sensor, an encoder, or a clock or a timing unit for measuring machine or component operational time.

In some embodiments, the one or more sensors may comprise an ATP sensor. In some cases, the one or more sensors may be configured to sense a type of dirt being cleaned, detect the presence of a bacteria, virus, or pathogen in a target area or the air surrounding the target area, and/or determine a type of bacteria, virus, or pathogen. In some embodiments, the one or more sensors may comprise an air quality sensor.

In some embodiments, the one or more sensors may comprise a vision sensor (e.g., a computer vision sensor). The vision sensor may comprise a lidar unit, a time of flight (TOF) camera, a binocular vision camera, or an ultrasonic sensor. In some cases, the vision sensor may be configured to detect debris on a floor. The detected debris may factor into the computation of a cleaning metric as described elsewhere herein. In some cases, a processor that is operatively coupled to the vision sensor may be configured to reprioritize a robot's route, a machine's route, or a cleaning routine/logic to pick up the remaining debris or to minimize the amount of debris remaining after a cleaning operation. In some cases, the one or more visions sensors can be used to detect water on a floor or water remnants/residue.

In some embodiments, the one or more sensors may comprise an impact sensor or an accelerometer that is configured to sense impacts and abuse. The impact sensor or accelerometer can be used to measure and report the force of the impact and sense abnormal impacts. In some cases, the data obtained using the impact sensor or accelerometer can be provided to a processing unit. In some cases, the processing unit may be configured to generate one or more signals based on the processing of said data. The one or more signals may correspond to an instruction to send a push notification for an impact event, or to notify an operator of the impact event via a display or a screen.

In some embodiments, the one or more sensors may be configured to detect amp draw for one or more motors of a cleaning machine or robot. In some cases, the one or more sensors can also detect changes or variations in amp draw over time, which can indicate sub-optimal robot or machine operation or usage.

Operational Data

The operational data of one or more robots or machines in a fleet may be gathered or obtained using one or more sensors of the one or more robots or machines. In some cases, the one or more sensors may comprise a position sensor, a GPS unit, an encoder, an odometer, an accelerometer, an inertial measurement unit (IMU), a gyroscope, or a velocity sensor. In some cases, the one or more sensors may comprise, for example, a temperature sensor, a pressure sensor, a humidity sensor, or any other type of environmental sensor for sensing the conditions of the environment in which the one or more robots or machines are being operated. In some cases, the one or more sensors may comprise an optical sensor or a vision sensor. The optical sensor may comprise, for example, an imaging sensor or a camera. In some cases, the one or more sensors may comprise a lidar sensor, a vision sensor, a time of flight sensor (e.g., a 3D time of flight sensor), a binocular vision sensor, a stereoscopic vision sensor, or an ultrasound sensor.

In some embodiments, the operational data may be received from a single robot and/or machine or from multiple robots and/or machines. In some cases, the operational data may be received from multiple robots and/or machine in series or sequentially. Alternatively, the operational data may be received from multiple robots and/or machines simultaneously or concurrently. As described above, the robots and/or machines may comprise autonomous, semi-autonomous, and/or non-autonomous robots or machines, or any combination thereof. Any combination of robots and/or machines, including autonomous, semi-autonomous, and non-autonomous machines or robots, can be used together to implement the systems and methods of the present disclosure.

In some cases, the operational data may comprise information on a geographical location of the one or more robots or machines. In some cases, the operational data may comprise information on a position, an orientation, or a pose of the one or more robots or machines. In some cases, the operational data may comprise information on a spatial distribution of the one or more robots or machines across an area or an environment.

In some cases, the operational data may comprise information on a battery level or a charge status of the one or more robots or machines and/or the one or more components of the one or more robots or machines. The battery level or charge status may indicate how long the robot or machine has been in operation, and how long the robot or machine may continue operating before losing power.

In some cases, the operational data may comprise fault information or alarm information for the one or more robots or machines and/or the one or more components of the one or more robots or machines. In some cases, the fault information may be generated automatically by the one or more robots or machines. In some cases, the fault information may be manually reported or generated by a user or an operator of the one or more robots or machines.

In some cases, the operational data may comprise information on work records, a cleaning path, or a cleaning performance for the one or more robots or machines. In some cases, the operational data may comprise information on a total time of use or operation for the one or more components.

In any of the embodiments described herein, the operational data may be periodically generated or compiled by the one or more robots or machines for transmission or upload to the central server. In any of the embodiments described herein, the operational data may be transmitted from the one or more robots or machines to the central server at one or more predetermined or periodic time intervals. In any of the embodiments described herein, the operational data may be transmitted from the one or more robots or machines to the central server at one or more time intervals that vary according to a historical usage or a total operational time of the one or more robots or machines.

In some embodiments, the operational data may be obtained using a float sensor. In some cases, the float sensor can indicate a full recovery tank and alert a user that the tank needs to be changed. In some cases, the float sensor can indicate an empty solution tank and alert a user that the tank needs to re-filled.

In some embodiments, the operational data may comprise information on an operational time of the robot or machine. The information on the operational time of the robot or machine can be used to determine when to activate a treatment or sanitization subsystem as described elsewhere herein. In some cases, the information on the operational time of the robot or machine can be used to alert or inform a user as to when the user should initiate a treatment or sanitization procedure (e.g., to sanitize or clean a component or subsystem of the robot or machine, or to disinfect a harmful substance or byproduct that is generated or built up over time as the robot or machine performs one or more cleaning operations).

In some embodiments, the operational data may comprise information on a frequency at which treatment or sanitization procedures occur or need to occur. In some cases, the operational data may comprise information on a duration for which treatment or sanitization procedures occur or need to occur. In some cases, the frequency information and/or the duration information may indicate how much or how often cleaning is performed over time, which can be correlated to a cleaning performance or a level of cleanliness for an area or an environment. In some cases, the frequency information and/or the duration information may factor into the computation of a cleaning metric (e.g., a clean score as described elsewhere herein).

Weights

The clean score may be computed based on one or more factors. The one or more factors may be weighted. In some embodiments, the weights associated to the one or more factors may be fixed or predetermined. Alternatively, the weight assigned to the one or more factors may be adjusted based on a characteristic or a property of the area being cleaned, the robot or machine used to clean the area, or the individual operating the robot or machine. In some cases, the one or more factors may correspond to the ratio of the area cleaned to an area goal, or to the ratio of the time cleaned to a time goal.

Rollup

People who are responsible for the cleanliness of multiple spaces may need a way to quickly scan the respective scores of various locations to identify which spaces were not satisfactorily cleaned. The respective scores for each of the various locations may correspond to a clean score as described elsewhere herein. In one example, the clean score may comprise a composite index number that is computed using cleaning data or machine operational data.

In some cases, the clean scores described herein may be compiled or aggregated to produce a composite number representing all spaces for a group of locations, along with a breakdown of spaces that were satisfactorily cleaned, marginally cleaned, and unsatisfactorily cleaned. The clean scores may be interpreted collectively as a tool for evaluating cleaning performance of a cleaning machine or a fleet of cleaning machines over multiple locations.

Figure 7A:
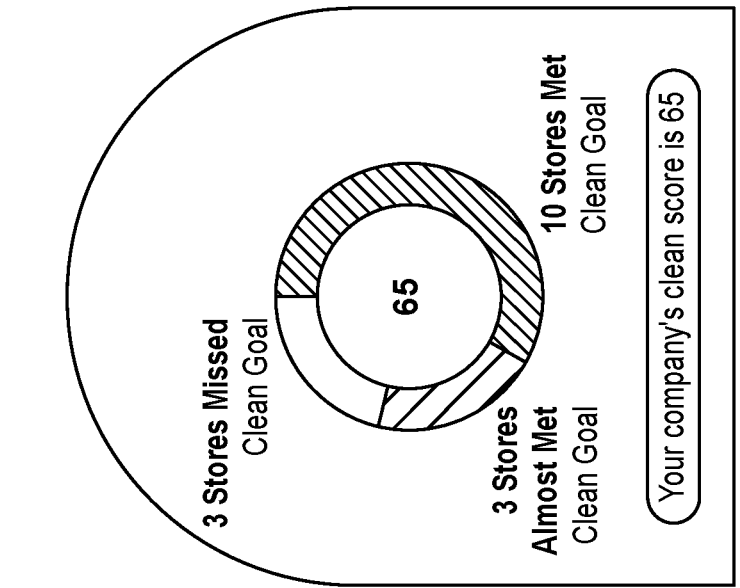
FIGS. 7A, 7B, and 7C schematically illustrate exemplary user interfaces for displaying a clean score and/or a rollup clean score, in accordance with some embodiments.
Figure 7B:
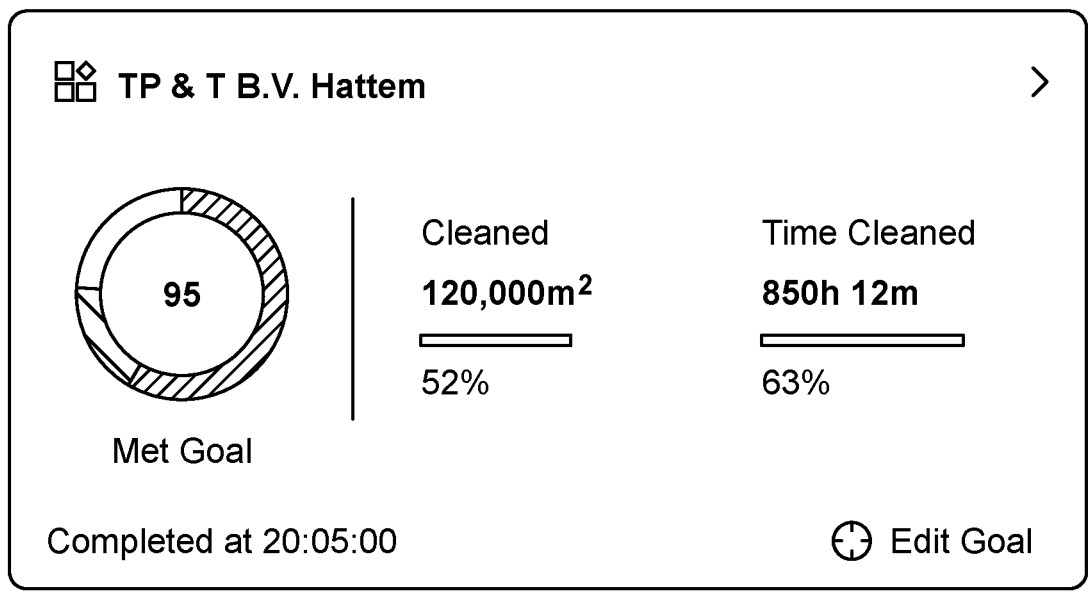
Figure 7C:
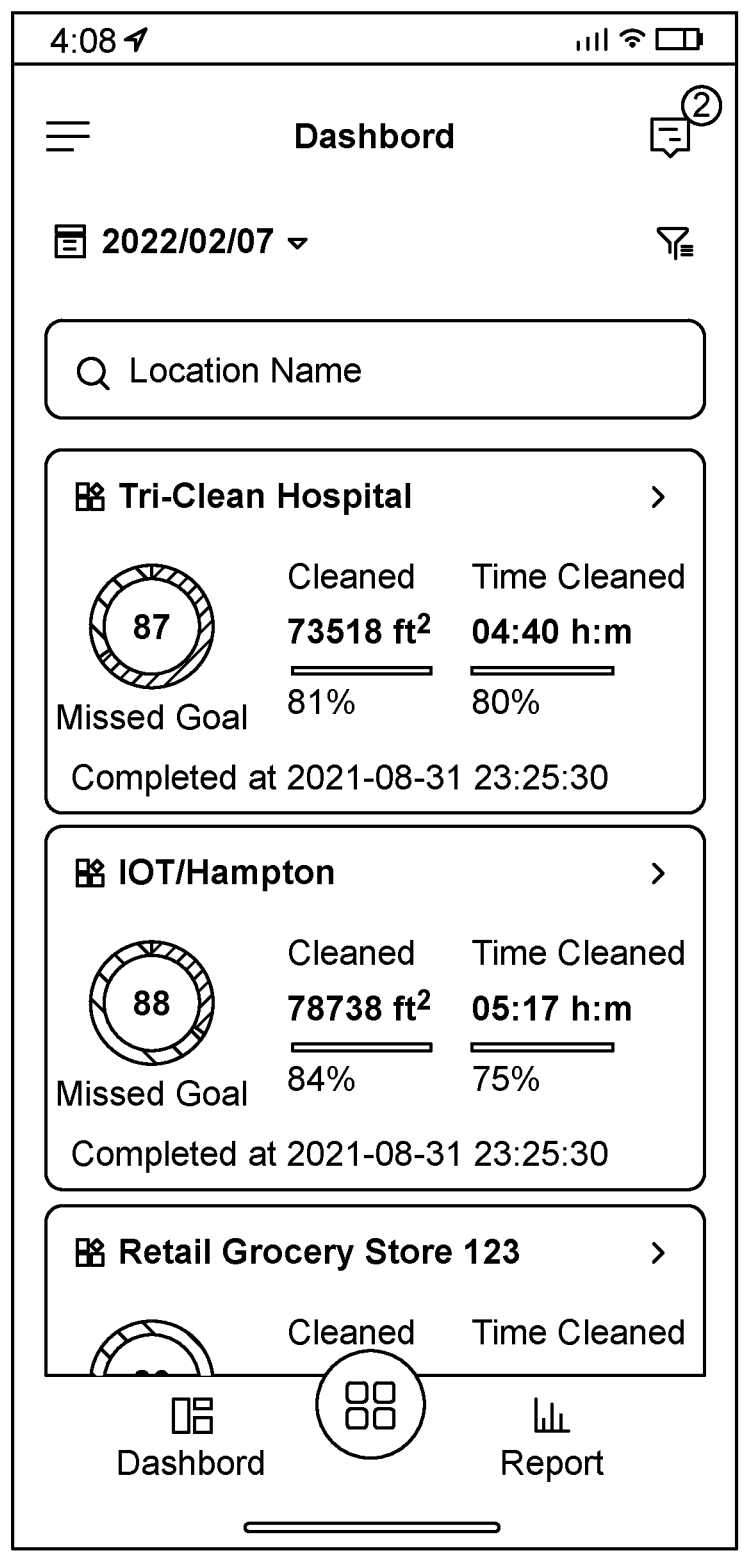

FIGS. 7A, 7B, and 7C schematically illustrate an exemplary user interface configured to provide a visual representation of a clean score and/or a rollup score. FIG. 7A shows an example of a rollup score. The rollup score may represent a cumulative metric of clean scores for multiple areas or locations. The rollup score may indicate an overall clean score for multiple areas or locations and a breakdown of (i) the areas or locations that have been satisfactorily cleaned, (ii) the areas or locations that have been marginally cleaned, and/or (iii) the areas or locations that have not been satisfactorily cleaned. In some embodiments, the rollup score may provide a breakdown of a number of areas or locations for which a clean goal has been met, a number of areas or locations for which a clean goal has not been met, and/or a number of areas or locations for which a clean goal has almost been met. The clean goal may be set by a user or an operator of a cleaning robot or machine, an entity managing or employing the user or the operator, or an entity managing the areas or locations to be cleaned. In some cases, the rollup score may be presented in a pie chart format. In other cases, the rollup score may be presented in any other appropriate format that conveys the level or quality of cleaning performed for each individual area or for multiple areas that are serviceable by a cleaning robot or machine. FIG. 7B shows another example of a user interface configured to provide a rollup score visualization to a user, an operator, or an administrator of a cleaning robot or machine. The user interface may present the rollup score in a format that a user can easily interpret to understand a relative breakdown of the areas or locations that have been satisfactorily cleaned, marginally cleaned, and/or unsatisfactorily cleaned. In some cases, the user interface may also indicate whether a cleaning goal has been met, a completion time for a cleaning task, a total area cleaned, an amount of time spent cleaning, a percentage of a total area that has been cleaned, and/or a percentage of a total cleaning time that has elapsed. FIG. 7C shows another example of a mobile application user interface configured to provide a rollup score visualization to a user, an operator, or an administrator of a cleaning robot or machine. The mobile application user interface may provide information on the rollup scores for a plurality of locations. The rollup scores for the plurality of locations may be determined based on an aggregation or combination of clean scores for multiple subareas or subregions within each of the plurality of locations. In some cases, the mobile application user interface may indicate whether a cleaning goal has been met for a particular location, a completion time for a cleaning task, a total area cleaned for a particular location, an amount of time spent cleaning a particular location, a percentage of a total area that has been cleaned, and/or a percentage of a total cleaning time that has elapsed.

In some embodiments, the clean scores for multiple locations may be integrated with or overlaid on a map of an environment comprising the multiple locations. This may permit the visualization of specific areas that have been satisfactorily cleaned, marginally cleaned, and unsatisfactorily cleaned.

Reports

In some cases, the clean scores may be compiled or included in a report. The report may be generated periodically (e.g., daily, weekly, monthly, yearly, etc.). In some cases, the clean scores may be generated after each cleaning operation performed by a robot or a machine.

A cleaning performance summary or report can be produced based on the clean scores. The summary may be for each individual robot or machine in a fleet.

Applications

In some embodiments, the clean scores and/or the reports described herein may be used to identify one or more locations or regions that may require additional cleaning or an alternative cleaning routine. In some cases, a processing unit may be configured to generate recommendations for another round of cleaning for a particular location. In some cases, the processing unit may be configured to generate recommendations for an alternative cleaning routine for a particular location.

In some embodiments, the processing unit may be configured to generate one or more recommendations to change a cleaning machine or robot used to perform the cleaning. In some embodiments, the processing unit may be configured to generate one or more recommendations to change out or replace one or more components of a cleaning machine or robot.

In some embodiments, the clean scores and/or the reports described herein may be used to determine one or more financial parameters associated with a cleaning operation or the operation of one or more robots or machines used to perform cleaning. In some cases, the one or more financial parameters may comprise a cost per cleaning per square foot. The cost may be determined differently for different levels of cleaning (e.g., for a satisfactory cleaning job or for a marginal cleaning job).

In some embodiments, the presently disclosed systems and methods can be used to accumulate or measure cleaning data or information over time for a certain space. The cleaning data or information may comprise data or information relating to the quality of the cleaning performed, the cleaning performance of a robot or machine, and/or one or more properties or characteristics of the area cleaned/to be cleaned.

In some cases, the cleaning data or information can be used to generate a baseline score. In some cases, newly acquired cleaning data or information can be compared to previously obtained cleaning data or information, and such comparison can be used to generate a relative metric that indicates whether cleaning is sufficient or insufficient. In some cases, different cleaning routes can be associated with different sets of reference cleaning data or information. Each set of reference cleaning data or information can comprise cleaning data or information that is compiled as a machine or robot traverses a same or similar route. In any of the embodiments described herein, the cleaning data or information can be used to generate a cleaning metric. In any of the embodiments described herein, the cleaning data or information can be used to generate one or more optimal cleaning routes for one or more target areas to be cleaned.

In some embodiments, the cleaning data or information can be used to identify water spots or other spots that may require additional cleaning, and to change the operation of the machine or the components of the machine to optimize cleaning performance.

In some cases, the cleaning data or information may comprise information on environmental factors associated with an operating environment of the robot or machine. The environmental factors may include, for example, temperature, humidity, or area of operation. In some cases, for example in colder climates, the robot or machine may automatically adjust its operation or movement to operate slower, increase vacuum power, and/or increase water flow.

In some cases, depending on the type of foreign object to be removed, the operation of the robot or machine can be changed to facilitate the removal of the object. In some cases, the robot or machine can be configured to classify different foreign objects (e.g., foreign object to be cleaned vs. obstacle to be avoided) and treat them differently based on one or more properties of those objects. For example, the robot or machine may clean objects differently based on the properties of those objects. In some cases, the robot or machine may be configured to make an intelligent decision as to whether to pick up an object for cleaning, suck in an object for cleaning, or to avoid the object (e.g., when the object is classified as an obstacle to be avoided), based at least in part on one or more properties of the object. The properties of the object may include, for example, a size, a shape, or a dimension of the object, a material property of the object, or a material composition of the object.

In some cases, a central server may be configured to process the cleaning data or information. In some cases, the central server may assign a first robot or machine to clean a first type of object and assign a second robot or machine to clean a second type of object. The first robot or machine and the second robot or machine may have different components, cleaning logics, or operational capabilities to address the respective cleaning tasks assigned to the robots or machine.

Management

The systems and methods disclosed herein may be used to manage a plurality of robots and/or machines. Managing the plurality of robots and/or machines may involve controlling an operation of the robots and/or machines, tracking the usage or the status of the robots and/or machines, monitoring robot and/or machine performance, or recording and updating one or more records associated with the robots and/or machines. The records may comprise, for example, user account records or financial records relating to a transaction (e.g., a sale or a lease) involving the robots. In some cases, managing the plurality of robots and/or machines may involve programming or directing the robots and/or machines to navigate an environment and perform one or more tasks while navigating the environment. The robots and/or machines may be programmed or directed to navigate various environments autonomously or semi-autonomously according to a predetermined or adjustable motion path or motion logic. In some cases, the robots and/or machines may be programmed to navigate different environments differently, or to navigate a same environment in different ways depending on the presence of obstacles or the time of day.

In some embodiments, managing the robots or machines may comprise obtaining operational data associated with the robots or machines and detecting changes or deviations in expected robot or machine performance or behavior. In some cases, managing the robots or machines may comprise assessing a robot's or machine's cleaning performance based on the operational data or the detected changes in expected robot or machine performance or behavior. In some cases, managing the robots or machines may comprise assessing, monitoring, evaluating, or scoring the cleanliness of an area that has been cleaned by a robot or a machine.

In some cases, the operational data associated with the robots or machines may comprise information on amp draw of one or more components (e.g., a motor). In some case, a property of the surface being cleaned (e.g., a type of surface) may be derived based on a brush motor amp draw and the type of brush being used to clean the surface. In some cases, the operational data may be used in combination or in conjunction with (i) the derived property of the surface being cleaned and/or (ii) information on the type of brush being used, in order to track component wear and recommend maintenance or component replacement/servicing. In some cases, if a user or operator does not change out a component of a robot or a machine at a scheduled or recommended interval, the cleaning performance of the robot or machine can be negatively impacted, and such impact can be reflected in a cleaning metric that is assigned to the robot or machine, or an area in which the robot or machine performs a cleaning operation.

System

In one aspect, the present disclosure provides a system for fleet management. The system may comprise one or more servers and/or one or more processing units. In some cases, the one or more servers may comprise the one or more processing units. The one or more servers and/or one or more processing units may be located remote from the one or more robots or machines and the environment in which the one or more robots or machines are operating.

FIG. 1 schematically illustrates an example of a system 101 that may be programmed or otherwise configured to implement methods of the present disclosure, including various methods for managing robots and/or machines or fleets of robots and/or machines and tracking or scoring cleaning. The system 101 may comprise a computer system comprising a central processing unit 105. The system 101 may further comprise a memory or memory location 110 (e.g., random-access memory, read-only memory, flash memory), an electronic storage unit 115 (e.g., hard disk), a communication interface 120 (e.g., network adapter) for communicating with one or more other systems (e.g., one or more robots or machines), and one or more peripheral devices 125, such as cache, other memory, data storage and/or electronic display adapters. The computer system 101 may be operatively coupled to a network 130 (or any servers accessible via the network 130) with the aid of the communication interface 120. In some embodiments, the computer system may include or be in communication with an electronic display 135 that comprises a user interface (UI) 140 for providing, for example, a portal for a user or operator to monitor or track cleaning performance or the cleanliness of an area or an environment.

Figure 2:
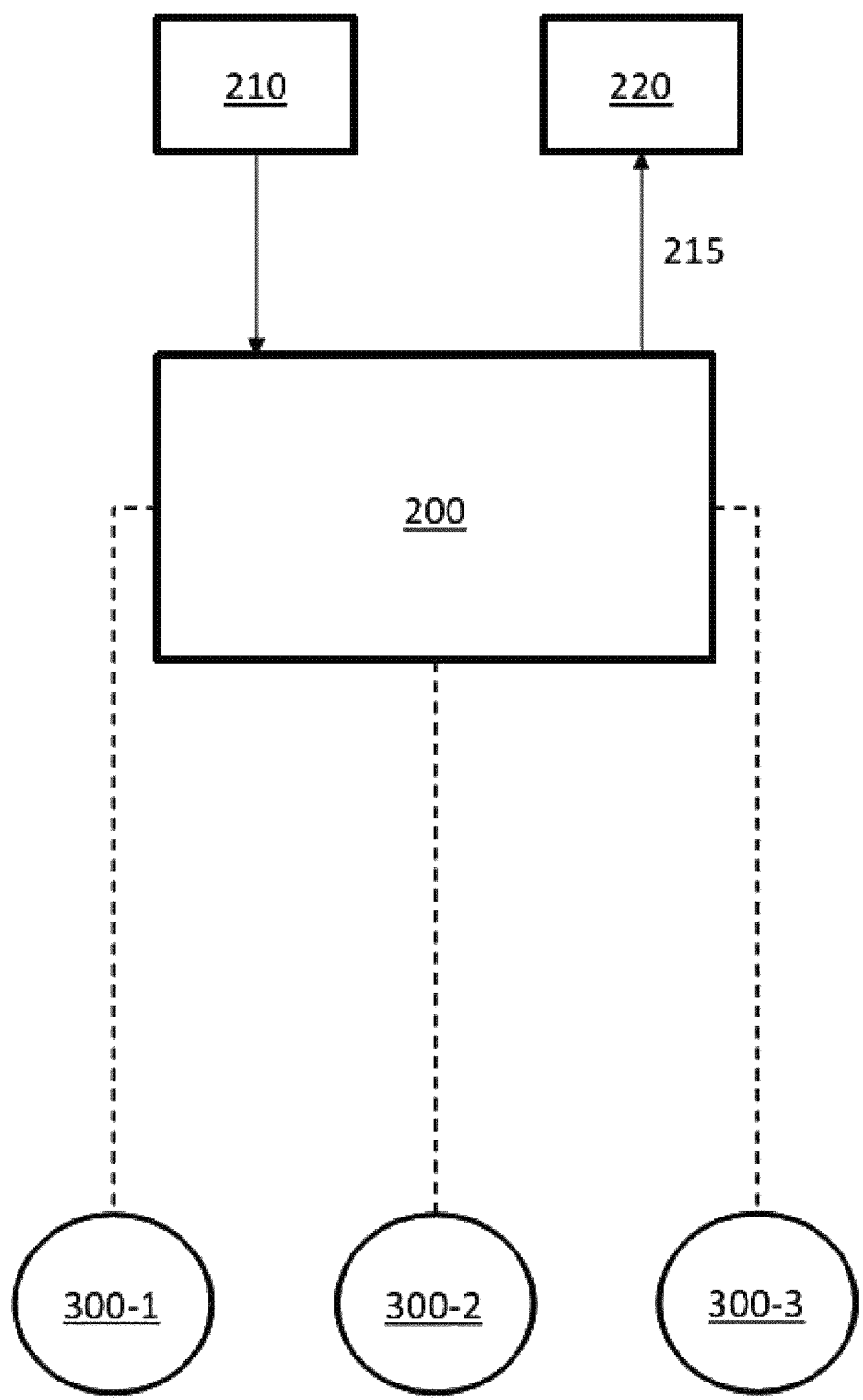
FIG. 2 schematically illustrates a plurality of robots and/or machines in communication with a central server, in accordance with some embodiments.

FIG. 2 schematically illustrates a central server 200 and a plurality of robots and/or machines 300-1, 300-2, and 300-3 that are in communication with the central server 200. The central server 200 may comprise or may be operatively coupled to the computer system 101 illustrated in FIG. 1. In some cases, the central server may be configured to receive operational data from the plurality of robots and/or machines 300-1, 300-2, and 300-3. The plurality of robots and/or machines 300-1, 300-2, and 300-3 may be in communication with each other. Alternatively, the plurality of robots and/or machines 300-1, 300-2, and 300-3 may not or need not be in communication with each other.

The plurality of robots and/or machines 300-1, 300-2, and 300-3 may each comprise one or more sensors. The one or more sensors may be used to capture the operational data associated with the operation or the status of the plurality of robots and/or machines 300-1, 300-2, and 300-3.

The central server 200 may be configured to process the operational data to determine the cleaning performance or the cleaning efficiency of a robot or a machine. In one example, the central server 200 may be configured to process the operational data to track, evaluate, and score a cleanliness of an area or an environment.

In some embodiments, the central server 200 may be configured to compare the operational data to one or more reference values or thresholds associated with the operation or the status of the one or more robots or machines or one or more components of the one or more robots or machines. In some cases, the central server 200 may be configured to receive the one or more reference values or thresholds from a memory module 210. The central server 200 may be configured to detect one or more changes or deviations in operation or expected behavior for the one or more robots or machines or the one or more components of the one or more robots or machines based at least in part on the comparison of the operational data to the one or more reference values or thresholds. The central server 200 may be configured to generate one or more reports or update an operational logic for the one or more robots or machines based on the detected changes or deviations, or based on one or more metrics computed using the operational data received from the one or more robots or machines.

In some embodiments, the central server 200 may be configured to generate and transmit one or more reports 215 to one or more entities 220. The one or more entities 220 may comprise an operator or an administrator of the one or more robots or machines. The one or more reports 215 may comprise one or more metrics associated with a cleaning performance of the one or more robots or machines or a cleanliness of an area that has been cleaned using the one or more robots or machines.

In some cases, the systems and methods of the present disclosure may be implemented using a platform for collecting and processing operational data of one or more robots or machines. The operational data of each robot or machine in a fleet may be transmitted to a central server or platform, which may be configured to collect and process the operational data. The operational data (and/or any other information that can be derived from the processing of the operational data) may be transmitted to one or more end user interfaces or portals to facilitate the monitoring and scoring of cleaning. In some cases, the central server or platform may comprise an IoT platform that synergizes the management of multiple cleaning robots or machines in a fleet based on operational data obtained from one or more robots or machines in the fleet.

In some cases, the platform may comprise a cloud server that is in communication with one or more robots or machines via a wireless communication network. The cloud server may be operatively coupled to a plurality of robots or machines that are configured to operate in an environment. In some cases, the environment may be an indoor environment that supports wireless communications.

In some cases, the cleaning robots or machines may be in communication with a cloud server via a network. The network may permit a transmission of data between (i) a service provider or a cloud server and (ii) the cleaning robots or machines. The service provider or cloud server may be configured to process data received from the robots or machines. The service provider or cloud server may be configured to monitor or control an operation of the robots or machines based on the operational data received from the robots or machines. In some cases, the service provider or cloud server may be configured to provide one or more clean scores, cleaning reports, and/or notifications to a user or an operator of the robots or machines based on the operational data received from the robots or machines. The one or more notifications may indicate, for example, that a change or deviation in expected robot or machine performance or behavior has been detected, or that a variance in a planned motion logic of the robot or machine has been identified. In some cases, the service provider or cloud server may interface with a mobile application or a web application to facilitate tracking of cleaning, robot or machine operation, and/or the processing of fleet information/operational data.

Figure 3:
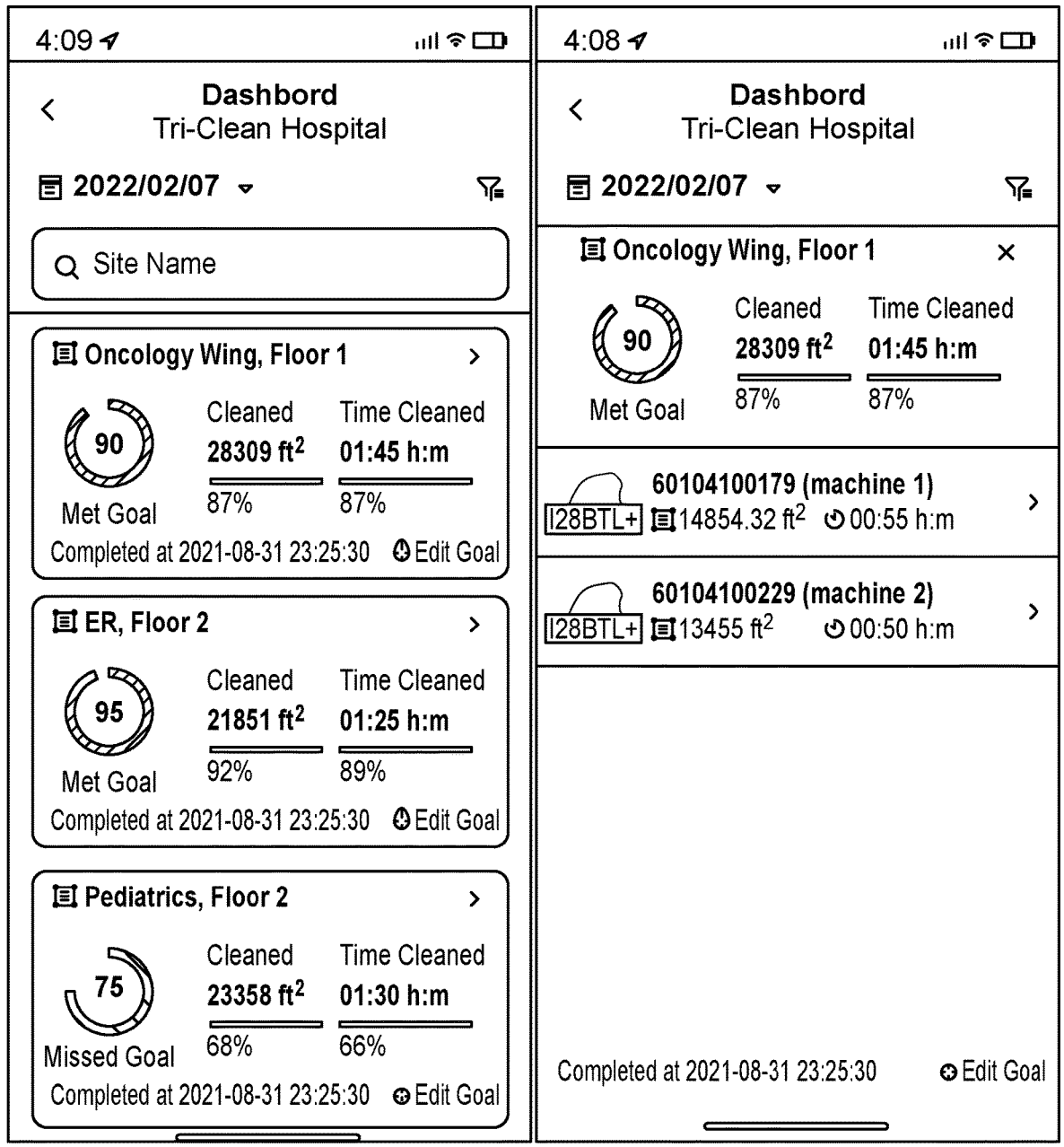
FIG. 3 schematically illustrates a user interface for presenting clean score information to a user or a consumer, in accordance with some embodiments.

FIG. 3 illustrates an exemplary user interface for presenting clean score information to an end user. The user interface may present the clean score information along with information on the site or location associated with the clean score, and the date on which the cleaning occurred. In some cases, the clean score may be individualized or generated for different subregions of the site or location (e.g., a particular floor or wing of the site or location). The user interface may permit the searching of various sites to view the clean score associated with one or more target sites of interest. For each target site of interest, the user interface may provide information on the clean score, the area cleaned, and the time spent to clean the target site of interest. In some cases, the user interface may also provide information on when a cleaning was completed, and the particular type or model of machine used to clean the target site of interest. The exemplary user interface shown in FIG. 3 may allow a customer to easily scroll through a plurality of target sites to identify one or more select sites that require special attention or cleaning procedures/protocols. The user interface may also permit a customer to identify the machines that are contributing to the clean score for a particular area or environment.

In some cases, if an area is only marginally cleaned or cleaned in an otherwise unsatisfactory manner, the user interface may provide a visual indication that the area was not cleaned in a sufficiently satisfactory manner. Such visual indication may include, for example, a color coding or a visual of a partially open circle. The partially open circle may correspond to a ratio between the actual clean score and the maximum possible clean score.

In some cases, if a user or an operator were to go back and clean an area or an environment a second time, the area cleaned and the time spent cleaning would be reflected in the score. The user would need to do this within the same time period as the first cleaning performed for that area in order for the score to be updated for that same time period. If the user or operator cleans the same area the next day, for example, that cleaning would be associated with the next day and the clean score generated for that next day.

Figure 4A:
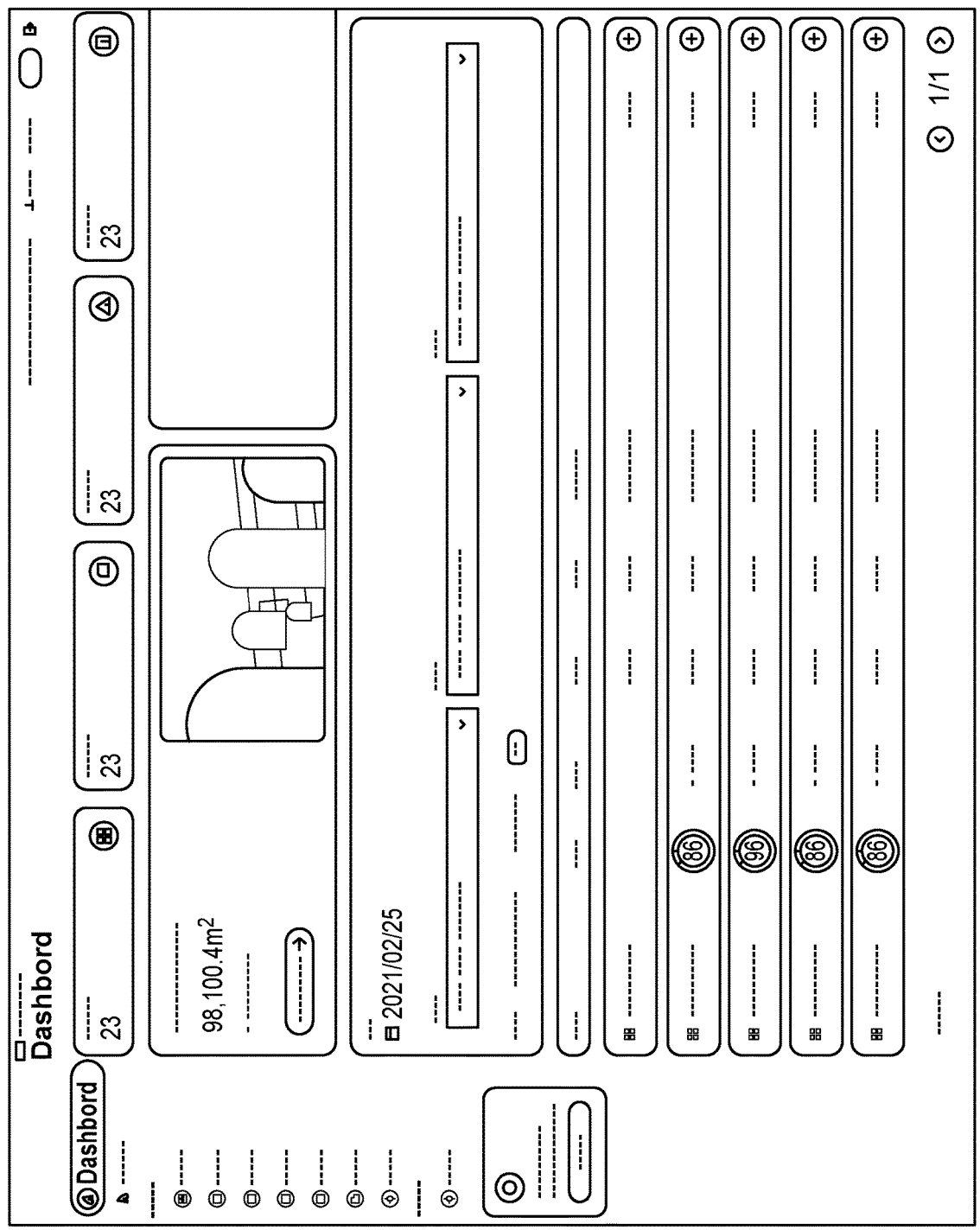
Figure 4B:
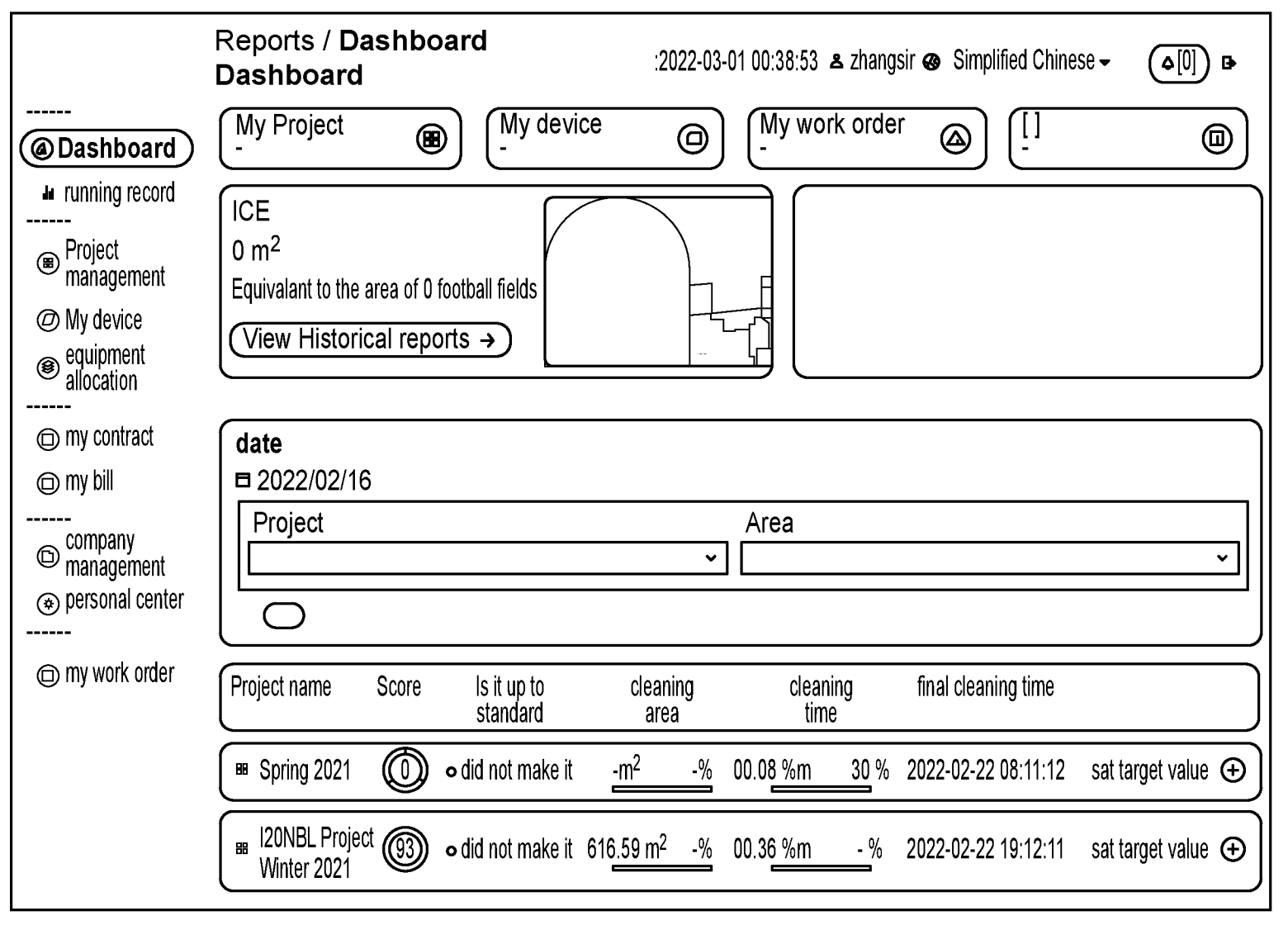

FIGS. 4A and 4B illustrate an exemplary web portal for viewing clean score information. The web portal may comprise a list of areas cleaned. In some cases, the web portal may be configured to provide information on the clean score for each area cleaned, as well as additional metrics such as the total square footage cleaned during a particular time period, or the total amount of time spent to perform a cleaning operation. The clean scores may be filtered by date or cleaning area to permit a user or a consumer to view clean scores for a particular data range or area of interest.

Figure 5:
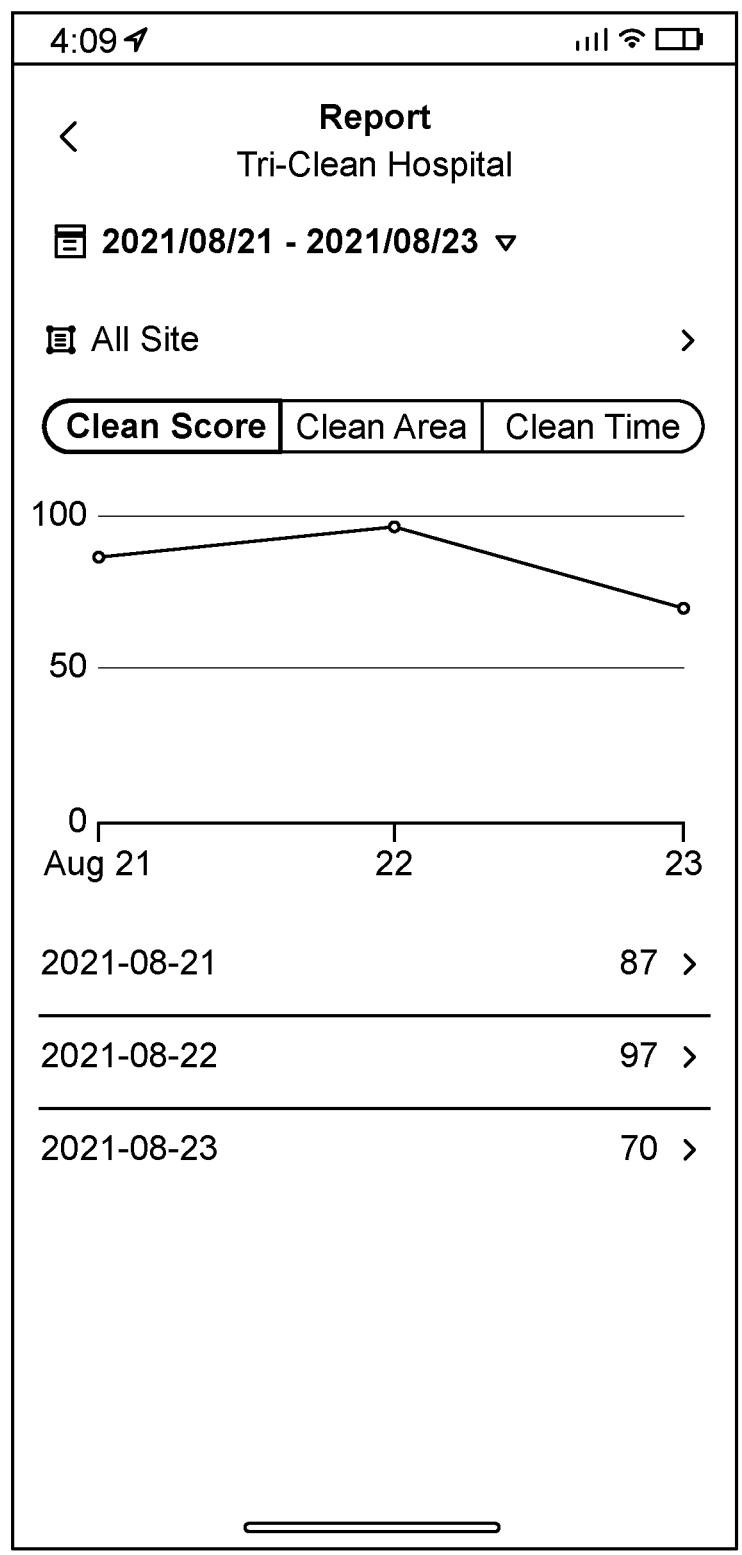
FIG. 5 and FIG. 6 schematically illustrate an exemplary clean score report that can be generated for an area or an environment, in accordance with some embodiments.
Figure 6:
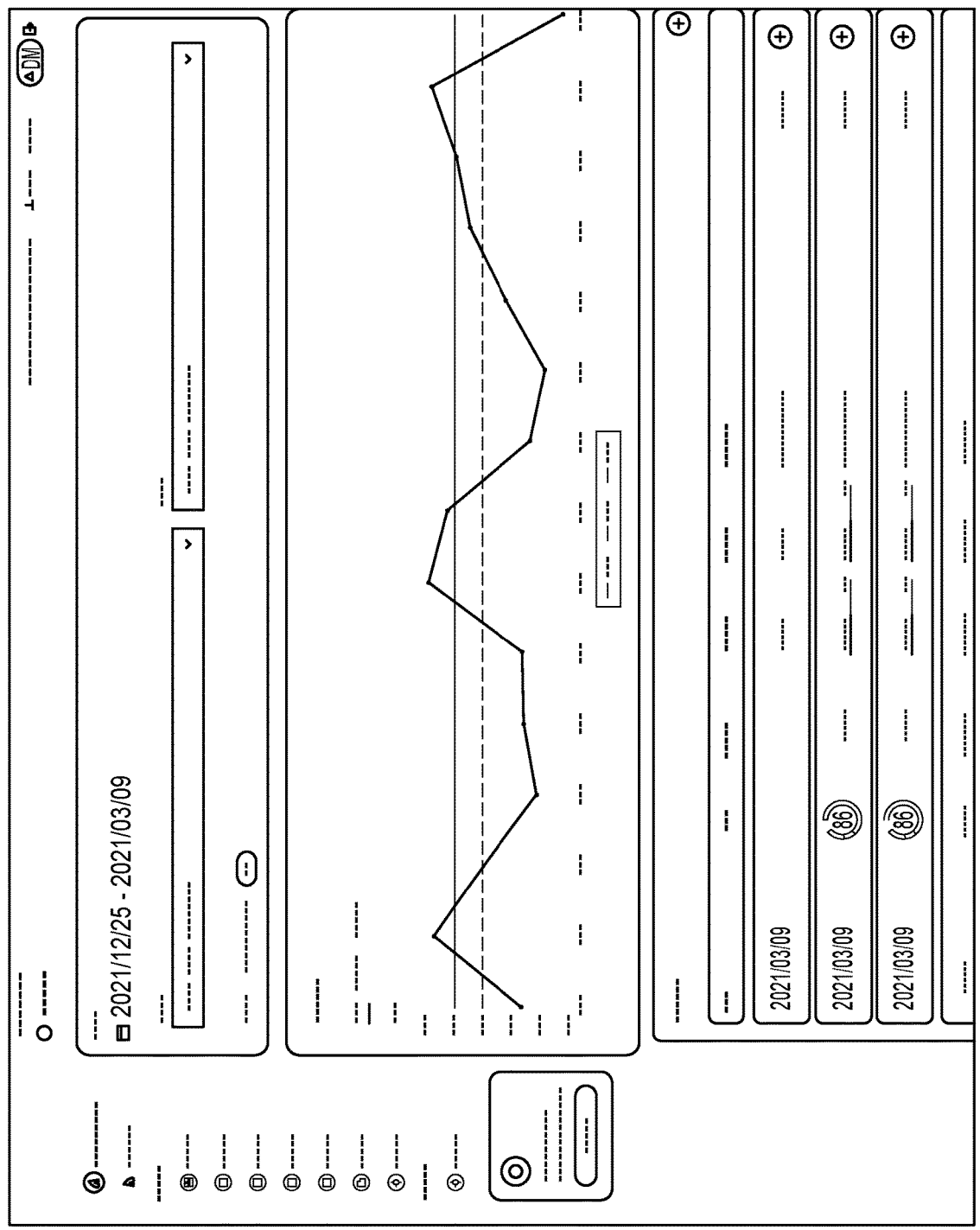

FIG. 5 and FIG. 6 illustrate an exemplary report that can be generated based on clean score information. The exemplary report may comprise a clean score report showing trends or changes in clean score over time for a customer or a site. In one example, the clean score report may provide a visualization of clean score, clean area, or clean time for a given site over a particular date range. In another example, the clean score report may provide a visualization of how the clean score changes for a given site over a particular date range. In some embodiments, the date range may be set or adjusted by a user.

In some cases, the clean score report may allow a user to view the site details that roll up for a given date. For instance, a user may view the individual cleaning metrics for various subregions of a target site and how those individual cleaning metrics impact, influence, or affect the overall clean score for a particular site. This may allow a user to identify problematic regions that require additional cleaning or a different cleaning protocol, and to target those problematic regions for additional cleaning with a modified or customized cleaning logic.

Scannable Codes

In some embodiments, one or more scannable codes may be used to facilitate clean score tracking. The one or more scannable codes may be associated with or affixable to the one or more robots or machines or the one or more components of the one or more robots or machines. In some cases, the one or more scannable codes may comprise one or more machine-specific or component-specific codes that are unique to the one or more robots or machines or the one or more components of the one or more robots or machines. In some cases, the one or more scannable codes may comprise a bar code, a quick response (QR) code, an April tag, a unique identifier, or a serial number.

In some embodiments, the one or more scannable codes may be scanned to see the cleaning performance of a particular robot or machine. In some embodiments, the one or more scannable codes may be scanned to see the clean score for an area that has been cleaned using a particular robot or machine. In any of the embodiments described herein, a central server may be configured to calculate and report a clean score for one or more robots or machines and/or one or more areas cleaned by the one or more robots or machines when an individual scans the one or more scannable codes. The clean score or cleaning performance information may be provided directly to the individual who scanned the one or more scannable codes via a display, a web application, or an application user interface.

Motion Paths

In some cases, the operation of the one or more robots or machines may be adjusted based on the clean score of an area or the cleaning performance of the one or more robots or machines. In some cases, one or more motion paths or cleaning routines assigned to the one or more robots or machines may be adjusted based on the clean score of an area or the cleaning performance of the one or more robots or machines. In some cases, the operation of the one or more robots or machines may be adjusted based on a detected change or deviation in expected robot or machine behavior or performance, or an expected cleanliness of an area or environment after one or more cleaning operations are performed.

Computer Systems

In an aspect, the present disclosure provides computer systems that are programmed or otherwise configured to implement methods of the disclosure, e.g., any of the subject methods for fleet management. Referring back to FIG. 1, a computer system 101 may be programmed or otherwise configured to implement a method for tracking and scoring cleaning performance. The computer system 101 may be configured to, for example, (i) process operational data for one or more robots or machines and/or one or more components of the one or more robots or machines; and (ii) compute a metric for one or more operations or procedures performed by the one or more robots or machines, based at least in part on the operational data for the one or more robots or machines and/or the one or more components of the one or more robots or machines. The computer system 101 can be an electronic device of a user or a computer system that is remotely located with respect to the electronic device. The electronic device can be a mobile electronic device.

The computer system 101 may include a central processing unit (CPU, also "processor" and "computer processor" herein) 105, which can be a single core or multi core processor, or a plurality of processors for parallel processing. The computer system 101 also includes memory or memory location 110 (e.g., random-access memory, read-only memory, flash memory), electronic storage unit 115 (e.g., hard disk), communication interface 120 (e.g., network adapter) for communicating with one or more other systems, and peripheral devices 125, such as cache, other memory, data storage and/or electronic display adapters. The memory 110, storage unit 115, interface 120 and peripheral devices 125 are in communication with the CPU 105 through a communication bus (solid lines), such as a motherboard. The storage unit 115 can be a data storage unit (or data repository) for storing data. The computer system 101 can be operatively coupled to a computer network ("network") 130 with the aid of the communication interface 120. The network 130 can be the Internet, an internet and/or extranet, or an intranet and/or extranet that is in communication with the Internet. The network 130 in some cases is a telecommunication and/or data network. The network 130 can include one or more computer servers, which can enable distributed computing, such as cloud computing. The network 130, in some cases with the aid of the computer system 101, can implement a peer-to-peer network, which may enable devices coupled to the computer system 101 to behave as a client or a server.

The CPU 105 can execute a sequence of machine-readable instructions, which can be embodied in a program or software. The instructions may be stored in a memory location, such as the memory 110. The instructions can be directed to the CPU 105, which can subsequently program or otherwise configure the CPU 105 to implement methods of the present disclosure. Examples of operations performed by the CPU 105 can include fetch, decode, execute, and writeback.

The CPU 105 can be part of a circuit, such as an integrated circuit. One or more other components of the system 101 can be included in the circuit. In some cases, the circuit is an application specific integrated circuit (ASIC).

The storage unit 115 can store files, such as drivers, libraries and saved programs. The storage unit 115 can store user data, e.g., user preferences and user programs. The computer system 101 in some cases can include one or more additional data storage units that are located external to the computer system 101 (e.g., on a remote server that is in communication with the computer system 101 through an intranet or the Internet).

The computer system 101 can communicate with one or more remote computer systems through the network 130. For instance, the computer system 101 can communicate with a remote computer system of a user (e.g., an operator or an administrator of a robot or a machine). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 101 via the network 130.

Methods as described herein can be implemented by way of machine (e.g., computer processor) executable code stored on an electronic storage location of the computer system 101, such as, for example, on the memory 110 or electronic storage unit 115. The machine executable or machine readable code can be provided in the form of software. During use, the code can be executed by the processor 105. In some cases, the code can be retrieved from the storage unit 115 and stored on the memory 110 for ready access by the processor 105. In some situations, the electronic storage unit 115 can be precluded, and machine-executable instructions are stored on memory 110.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media including, for example, optical or magnetic disks, or any storage devices in any computer(s) or the like, may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 101 can include or be in communication with an electronic display 135 that comprises a user interface (UI) 140 for providing, for example, a portal for a user or an operator to monitor or track an operation of one or more robots or machines or a cleaning metric for one or more locations cleaned by the one or more robots or machines. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 105. For example, the algorithm may be configured to (i) process operational data for one or more robots or machines and/or one or more components of the one or more robots or machines; and (ii) compute a metric for one or more operations or procedures performed by the one or more robots or machines, based at least in part on the operational data for the one or more robots or machines and/or the one or more components of the one or more robots or machines.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method, comprising:
   (a) detecting, by one or more first sensors operably coupled to one or more robots or machines, one or more qualities of an environment of the one or more robots or machines;
   (b) detecting, by one or more second sensors operably coupled to one or more robots or machines, operational data of the one or more robots or machines and/or one or more components of the one or more robots or machines;
   (c) computing a metric for one or more operations or procedures performed by the one or more robots or machines, based at least in part on (i) the one or more qualities of the environment and (ii) the operational data for the one or more robots or machines and/or the one or more components of the one or more robots or machines; and (d) controlling an operation or movement of the one or more robots or machines based at least in part on the metric.

2. The method of claim 1, wherein the one or more qualities of the environment comprises at least one of air quality, gloss or light reflectivity, amount and/or sizes of debris, or amount of liquid on a floor of the environment.

3. The method of claim 2, wherein in (a), detecting the one or more qualities of the environment comprises detecting a cleanliness of a filter in the one or more robots or machines to determine air quality of the environment.

4. The method of claim 2, wherein in (a), detecting the one or more qualities of the environment comprises detecting an amount of the gloss or light reflectivity on a surface of the environment to detect an amount of residue present in the environment.

5. The method of claim 2, wherein in (a), detecting the one or more qualities of the environment comprises performing an adenosine triphosphate (ATP) test to determine an amount of bacteria or pathogens present on a surface of the environment.

6. The method of claim 2, wherein in (a), detecting the one or more qualities of the environment comprises using a vision sensor to detect an amount of debris in the environment.

7. The method of claim 2, wherein in (a), detecting the one or more qualities of the environment comprises using a vision sensor to detect an amount or level of water on a surface of the environment.

8. The method of claim 1, wherein the operational data of the one or more robots or machines and/or one or more components of the one or more robots or machines comprises at least one of duration of operation, frequency of operation, area of operation, quality of waste water, frequency and/or duration of treatment and/or sanitization, how the one or more robots or machines and/or one or more components was used, dosage level used in one or more chemicals, or amount of exhaust pollutant.

9. The method of claim 8, wherein in (b), detecting the operational data comprises an amount of time that the one or more robots or machines operated.

10. The method of claim 8, wherein in (b), detecting the operational data comprises a frequency of operation of the one or more robots or machines.

11. The method of claim 8, wherein in (b), detecting the operational data comprises an area that the one or more robots or machines operated over.

12. The method of claim 8, wherein in (b), detecting the operational data comprises using a total dissolved solids (TDS) sensor to detect cleanliness of wastewater captured by a filter in the one or more robots or machines.

13. The method of claim 8, wherein in (b), detecting the operational data comprises detecting a frequency or duration of which treatment or sanitation procedures occur.

14. The method of claim 8, wherein in (b), detecting the operational data comprises detecting whether the one or more robots or machines have been misused or abused during operation.

15. The method of claim 8, wherein in (b), detecting the operational data comprises testing a pH level of used cleaning solution in the one or more robots or machines to detect a dosage level of a chemical in the used cleaning solution.

16. The method of claim 8, wherein in (b), detecting the operational data comprises detecting an amount of pollutants in an exhaust of the one or more robots or machines to determine an amount of dirt or debris captured by the one or more robots or machines during operation.

17. The method of claim 8, wherein in (b), detecting the operational data comprises using an impact sensor or an accelerometer to measure a force of impact and/or abnormal impacts to detect impacts and/or abuse.

18. The method of claim 1, wherein the metric comprises a clean score.

19. The method of claim 1, wherein the one or more qualities of the environment and the operational data are categorized into one or more factors, and wherein the metric is computed further based at least in part on one or more weights corresponding to the one or more factors.

20. The method of claim 1, further comprising, after (c) and before (d), generating one or more recommendations for using at least in part the metric, for controlling the operation or movement of the one or more robots or machines.

* * * * *